United States Patent
Pollmann (10) Patent No.: US 10,976,867 B1
(45) Date of Patent: Apr. 13, 2021

(54) SYSTEM AND METHOD PROVIDING PEN UP POSITIONING ASSIST FOR A SENSOR SURFACE

(71) Applicant: Wacom Co., Ltd., Saitama (JP)

(72) Inventor: Konrad Wilhelm Pollmann, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/812,141

(22) Filed: Mar. 6, 2020

(51) Int. Cl.
 *G06F 3/041* (2006.01)

(52) U.S. Cl.
 CPC ...... *G06F 3/04186* (2019.05); *G06F 3/04162* (2019.05); *G06F 2203/04101* (2013.01); *G06F 2203/04105* (2013.01)

(58) Field of Classification Search
 CPC ............. G06F 3/04186; G06F 3/04162; G06F 2203/04101; G06F 2203/04105
 See application file for complete search history.

(56) References Cited

U.S. PATENT DOCUMENTS

| | | | | |
|---|---|---|---|---|
| 10,126,873 | B2 * | 11/2018 | Ohi | G06F 3/0383 |
| 2007/0038538 | A1 * | 2/2007 | Silverbrook | G06F 3/0321 |
| | | | | 705/35 |
| 2011/0304577 | A1 * | 12/2011 | Brown | G06F 3/0383 |
| | | | | 345/174 |
| 2011/0304643 | A1 * | 12/2011 | Marison | G06T 11/40 |
| | | | | 345/611 |
| 2011/0310118 | A1 * | 12/2011 | Asmi | G06F 3/04883 |
| | | | | 345/619 |
| 2013/0271487 | A1 * | 10/2013 | Lincoln | G06F 3/0488 |
| | | | | 345/619 |
| 2013/0278550 | A1 * | 10/2013 | Westhues | G06F 3/0446 |
| | | | | 345/174 |
| 2014/0118295 | A1 * | 5/2014 | Motoi | G06F 3/04883 |
| | | | | 345/174 |
| 2015/0054795 | A1 * | 2/2015 | Takami | G06F 3/0418 |
| | | | | 345/178 |
| 2015/0091832 | A1 * | 4/2015 | Mizunuma | G06F 3/03545 |
| | | | | 345/173 |
| 2015/0227258 | A1 * | 8/2015 | Wang | G06F 3/04186 |
| | | | | 345/174 |
| 2015/0347001 | A1 * | 12/2015 | Motoi | G06K 9/222 |
| | | | | 345/173 |
| 2016/0092021 | A1 * | 3/2016 | Tu | G06F 3/0237 |
| | | | | 345/173 |
| 2016/0266663 | A1 * | 9/2016 | Holsen | G06F 3/04166 |

(Continued)

*Primary Examiner* — Amy Onyekaba
(74) *Attorney, Agent, or Firm* — Seed IP Law Group LLP (57) ABSTRACT

A method of generating pen data includes periodically sampling an interaction of a pen on a sensor surface in which a detected pen tip pressure is greater than zero. Pen data including detected pen positions are reported. In response to a pen up event in which the detected pen tip pressure is zero, an intended end-of-stroke position of the pen tip is predicted based on a detected pen tip position occurring at least two, three, or more samples earlier than the sample at the pen up event. The predicted intended end-of-stroke position is reported in (1) the pen data for the sample at the pen up event, in place of the actual pen tip position detected at the pen up event, or in (2) the pen data for one or more samples preceding the pen up event, in place of the actual pen tip position in the one or more samples preceding the pen up event.

23 Claims, 6 Drawing Sheets

(56) References Cited

U.S. PATENT DOCUMENTS

| | | | | |
|---|---|---|---|---|
| 2017/0371484 A1* | 12/2017 | Fleck | ............. | G06F 3/0418 |
| 2017/0371485 A1* | 12/2017 | Ohi | ............. | G06F 3/03547 |
| 2018/0018057 A1* | 1/2018 | Bushnell | ............. | G06F 3/0412 |
| 2018/0046268 A1* | 2/2018 | Keidar | ............. | G06F 3/04162 |
| 2018/0181221 A1* | 6/2018 | Nakajima | ............. | G06F 3/03547 |
| 2019/0155498 A1* | 5/2019 | Angelov | ............. | G06K 9/222 |
| 2019/0235649 A1* | 8/2019 | Oyama | ............. | G06F 3/0442 |
| 2019/0310738 A1* | 10/2019 | Dyvik | ............. | G06F 3/0447 |
| 2020/0026369 A1* | 1/2020 | Hisano | ............. | G06F 3/03545 |
| 2020/0050321 A1* | 2/2020 | Dyvik | ............. | G06F 3/03547 |

* cited by examiner

SYSTEM AND METHOD PROVIDING PEN UP POSITIONING ASSIST FOR A SENSOR SURFACE

BACKGROUND

Technical Field

This disclosure generally relates to interaction of a pen with a sensor surface, and more particularly to reporting of a detected position of a pen tip on the sensor surface.

Description of the Related Art

Pen-based input using, for example, a tablet-based computer or an electronic device having a sensor surface, is increasingly prevalent. In many respects, the use of a pen on a touch sensitive display or surface (or more generally, a "sensor surface") provides the user with the intuitive feel of writing on paper or other natural, real-world media. Circuitry in the sensor surface periodically samples the interaction of the pen with the sensor surface, and as the pen is drawn across the sensor surface, the circuitry detects the position of the pen tip at each sample and supplies pen data that includes the detected position of the pen tip at each sample. The position data may be expressed as X, Y coordinate values, for example. The pen data are typically supplied to application software which, in operation, processes the data and produces output on a display.

Digital artists working with a pen on a sensor surface are frequently required to place a cursor, object, crosshair, or the like, in a display with pixel-accuracy, e.g., when dragging a pen tip on the sensor surface to define a selection box, when moving an object to a very specific position on the display, when placing a crosshair at a specific location, etc. Digital artists working in vector applications or 3D environments even more frequently have this need.

A challenge that these artists encounter—especially with increasing resolution of computer displays and/or with multiple monitors—is that frequently they place a cursor, object, or crosshair at exactly the right pixel, but when they lift their pen tip from the display, the cursor, object, or crosshair moves a little, from one to a few pixels. With this unintended "last moment" movement of the pen resulting in an incorrect placement, they have to repeat the task to correctly place the cursor, object, or crosshair. Even experienced pen users may require multiple attempts to place the cursor, object, or crosshair perfectly. This slows down their workflow and productivity by increasing the time spent on these tasks as well as generates frustration, and prevents some groups of creative professionals from using a pen for their work. This last moment pixel movement may result from a combination of necessary flexibility in the hardware and a natural movement of the user's hand as they reduce the pressure on the pen tip when lifting their pen from the sensor surface.

BRIEF SUMMARY

In various embodiments, the present disclosure describes an algorithmic approach to determine whether a user was most likely trying to place their pen at a specific location on a sensor surface when the user lifted their pen tip from the sensor surface (a "pen up event"), but in the process of releasing the pen tip pressure, there was an accidental "slip" of the pen. If the determination is affirmative, then circuitry in the sensor surface compensates for the accidental slip by substituting a predicted intended "end-of stroke" position of the pen for the actual detected pen position when reporting the pen data (including pen position) to the application software that processes the pen data.

Testing has shown that, in many cases, users hold their pen tip fairly steady for a relatively long time (e.g., 50-500 milliseconds) before the final pen up event, and only in the last 20-50 ms did the pen tip position change significantly, reflecting unintended final moment movement or unintended positioning of the pen. Testing has also shown that in many cases, users approach the moment of lifting their pen tip with fairly consistent pressure on the sensor surface, and then lift the pen tip rather quickly in the last 50-80 ms. Therefore, as will be described below, various embodiments of the disclosure may analyze the distance that a pen has traversed the sensor surface or the pressure of the pen tip on the sensor surface in those "final moments" preceding a pen up event, and use aspects of that analysis to determine whether the user was trying to place the pen tip at a specific location at the time they lifted their pen from the sensor surface.

Embodiments described herein seek to eliminate the effect of unintended final moment movement, or slip, of the pen tip, and instead restore the reported position of the pen tip at a pen up event to the position that the user targeted before they lifted the pen from the sensor surface. In various embodiments, the algorithms employed by embodiments described herein may also seek to avoid negative effects of this "final position substitution" on other typical uses of a pen (e.g., drawing and sketching) where final movement of the pen tip at the end of the pen stroke (at the time the pen is lifted) may be intentional. Preferably, the algorithms are tuned to find a high probability that the user intended to release the pen tip at a particular location when they lifted the pen from the sensor surface before substituting a predicted intended end-of-stroke position for an actual detected pen tip position at the end of the stroke.

In some embodiments of the present disclosure, circuitry (e.g., in the sensor surface) is configured (e.g., by way of firmware or a device driver operating in the circuitry) to report pen data, including pen position data, to application software as the pen data is generated. The application software receiving the reported pen data does not require special programming or routines to identify or compensate for unintended movement of the pen tip at the end of a stroke when the pen is lifted from the sensor surface. Instead, the circuitry has already compensated for the unintended movement by having determined a predicted intended end-of-stroke position of the pen tip at the pen up event and reported that predicted position in place of the actual position of the pen tip detected before or at time of the pen up event. Such embodiments of the present disclosure may appear more responsive to the user as pen data is regularly reported in response to the user's interaction with the sensor surface. The application software can immediately act on the reported data, without having to buffer the incoming data and attempt to discern and/or compensate for unintended movements of the pen. The firmware or device driver may allow a user to selectively enable or disable the programming that provides the "compensation" processing of the present disclosure.

In some embodiments of the present disclosure, circuitry is configured (e.g., by way of application software operating in the circuitry) to receive pen data, including pen tip position data, from a sensor surface, preferably as the pen data is generated. The application software receiving the reported pen data may include programming or routines according to the present disclosure that identify and compensate for unintended movement of the pen tip at the time of a pen up event. The circuitry is configured by the application software to compensate for the unintended movement by having a predicted intended end-of-stroke position of the pen tip at the pen up event substituted for the actual position of the pen tip that was detected and reported by the sensor surface, before or at time of the pen up event. Such embodiments of the present disclosure may allow the application software to include options that a user can select to enable or disable the programming or routines that provide the "compensation" processing of the present disclosure, or the application software may be configured to employ the "compensation" processing only for tools and/or functions that would benefit from it.

In various embodiments, the present disclosure describes methods, systems, and computer-readable media for operating a sensor surface and generating pen data that includes position data reflecting the position of the pen tip relative to the sensor surface. For example, a method embodiment of the present disclosure may include steps of periodically sampling an interaction of a pen with a sensor surface in which a detected pressure of the pen tip on the sensor surface is greater than zero, and reporting a series of pen data, $PD_0$ to $PD_{zN-1}$, wherein each pen data, $PD_0$ to $PD_{N-1}$, includes respective position data, $P_0$ to $P_{N-1}$, that are based on a detected position of the pen tip on the sensor surface in each sampling. The method may include sampling a current interaction of the pen with the sensor surface at a pen up event in which the detected pressure of the pen tip on the sensor surface is zero. In response to the pen up event, the method may predict an intended end-of-stroke position, $P_I$, of the pen tip based on a detected position of the pen tip occurring at least two, three, or more samples earlier than the sample at the pen up event. The method may then report the intended end-of-stroke position, $P_I$, for the detected position of the pen tip, e.g., in pen data, $PD_N$, for the sample at the pen up event. In such case, the intended end-of-stroke position, $P_I$, is reported in the pen data, $PD_N$, in place of the position of the pen tip, $P_N$, detected in the sample at the pen up event. Alternatively, or possibly in addition, the method may report the intended end-of-stroke position, $P_I$, for the detected position of the pen tip in pen data for one or more samples preceding the pen up event. In such case, the intended end-of-stroke position, $P_I$, is reported in the pen data for the one or more samples in place of the position of the pen tip detected in the one or more samples preceding the pen up event.

In some embodiments, the intended end-of-stroke position, $P_I$, is reported in the pen data, $PD_{N-1}$, for the sample immediately preceding the pen up event in place of the position of the pen tip, $P_{N-1}$, detected in the sample immediately preceding the pen up event.

As noted earlier, the substitution of intended end-of-stroke position data may be performed by firmware operating in circuitry (e.g., of the sensor surface), and the modified position data are reported or communicated by the firmware to application software for further processing. Alternatively, the substitution of intended end-of-stroke position data may be performed by a device driver operating in circuitry, wherein, when executed, the device driver enables interaction of application software with the sensor surface, and the modified position data are reported or communicated by the device driver to the application software for further processing. Alternatively, the substitution of intended end-of-stroke position data may be performed by application software operating in circuitry of the system.

In various embodiments, when reporting a series of pen data, $PD_0$ to $PD_{N-1}$, each pen data in the series may further include pressure data, $F_0$ to $F_{N-1}$, based on a detected pressure of the pen tip on the sensor surface in each sampling. In some cases, if the intended end-of-stroke position, $P_I$, is reported in the pen data, $PD_N$, for the sample at the pen up event, the method may substitute a nominal value for pressure data, $F_N$, in the pen data, $PD_N$, for the sample at the pen up event.

In various embodiments, the method may further comprise a step of determining unintended positioning of the pen tip in the one or more samples preceding the pen up event, in which the unintended positioning of the pen tip is determined based on the detected pressure of the pen tip in the one or more samples. The method may report the intended end-of-stroke position, $P_I$, for the detected position of the pen tip in the pen data for each of the one or more samples in which unintended positioning of the pen tip has been determined. The intended end-of-stroke position, $P_I$, is predicted using a detected position of the pen tip occurring in a sample in which unintended positioning of the pen tip has not been determined, i.e., is "stable."

In various embodiments, the method may further comprise, in response to a pen up event, determining a distance traversed by the pen tip on the sensor surface over a set of samples preceding the pen up event. The distance traversed may be determined based on a difference of detected position of the pen tip over the set of samples. Thereafter, the determined distance is compared with a predetermined threshold distance, and only when the determined distance is within the predetermined threshold distance is the intended end-of-stroke position, $P_I$, reported in place of the actual detected position of the pen tip as described above. By employing a distance-based threshold in this manner, such embodiments may limit the effect of substituting a predicted "intended" position data for actual position data to those circumstances having a higher probability that the user intended to release the tip of the pen at a particular location when they lifted the pen tip from the sensor surface.

In some cases, such predetermined threshold distance may be defined as a circular threshold, having a predetermined radius that extends from a detected position in the set of samples. Alternatively, in some cases, the predetermined threshold distance may be a rectangular threshold having a predetermined length and width that surrounds a detected position in the set of samples.

In various embodiments, the method may comprise, in response to a pen up event, determining a speed of release of pressure of the pen tip on the sensor surface over a set of samples preceding the pen up event. The speed of release may be determined based on a difference of detected pressure of the pen tip over the set of samples, and then compared with a predetermined threshold speed of release. Only when the determined speed of release is greater than or equal to the predetermined threshold speed of release (i.e., the user quickly lifts the pen) is the intended end-of-stroke position, $P_I$, reported in place of the actual detected position of the pen tip.

In some embodiments, the determined distance described above may be a first distance obtained using a first set of samples, with the predetermined threshold distance being a first threshold distance. In such embodiments, the method may further comprise, in response to the pen up event, determining a second distance traversed by the pen tip on the sensor surface over a second set of samples preceding the pen up event. The second set of samples may include samples that are closer in time to the pen up event than the samples in the first set of samples, and the second distance may be determined based on a difference of detected position of the pen tip over the second set of samples. The determined second distance is then compared with a predetermined second threshold distance. Only when the first distance is within the predetermined first threshold distance and the second distance is within the predetermined second threshold distance is the intended end-of-stroke position, $P_I$, reported in place of the actual detected position of the pen tip. By employing two distance-based thresholds in this manner (i.e., a first threshold distance and a second threshold distance), such embodiments may further limit the substitution of predicted "intended" position data for actual position data to those circumstances having a higher probability that the user intended to release the tip of the pen at a particular location when they lifted the pen from the sensor surface.

In various embodiments, two distance-based thresholds and a pressure speed of release threshold, e.g., as described above, may be combined. In such embodiments, in response to the pen up event, the method may comprise reporting the intended end-of-stroke position, $P_I$, for the detected position of the pen tip when the first distance is within the predetermined first threshold distance, the second distance is within the predetermined second threshold distance, and the speed of release is greater than or equal to the predetermined threshold speed of release. In some embodiments, performing the threshold inquiries may be accomplished sequentially in which a threshold inquiry is performed only if the previous threshold inquiry was satisfied. For example, the step of determining the speed of release may be performed only after determining that the second distance is within the predetermined second threshold distance. Alternatively, for example, the step of determining the second distance may be performed only after determining that the speed of release is greater than or equal to the predetermined threshold speed of release.

Also described herein are embodiments of a system with a sensor surface having circuitry that generates pen data using various method steps as described herein, along with embodiments of non-transitory computer-readable media having executable code stored thereon that, in response to execution by a processor, causes a computing device to implement method steps as described herein.

DETAILED DESCRIPTION

Generally stated, in various embodiments, the present disclosure provides ways to improve the perceived accuracy of user interactions with a sensor surface, particularly the positioning of a pen tip at a precise location when lifting the pen from the sensor surface. This is done by modifying or altering the reported position data representing the end of stroke of the pen tip when a pen up event occurs. In some embodiments, as will be described herein, conditions or thresholds representing distance and/or pressure of the pen tip prior to the pen up event may be used to determine when a user is intending to place the pen tip at a precise location on the sensor surface and accidental slip of the pen tip has occurred.

A pen as described and used herein may be any form of a stylus, pointer, or other structure, including a user's finger, that is capable of interacting with a sensor surface. A sensor surface may be any form of a position-detecting device that is capable of detecting a pen, or more precisely the tip of a pen, and reporting pen data including position data that reflect the position and movement of the pen tip relative to the sensor surface. Pen data may also include pressure data reflecting the pressure of the pen tip on the sensor surface.

Technologies for pen and/or touch sensing sensor surfaces are presently known. For example, some sensor surfaces incorporate pressure-sensitive or analog-resistive film technologies that identify pen activity based on changes in pressure on the sensor surface caused at a point of contact by the pen tip on the sensor surface. Other types of sensor surfaces incorporate analog surface capacitive or projected capacitive technologies in which pen activity is identified using sensors that detect minor changes in electrical current or electrostatic capacitance caused by the pen. Other examples of sensor surfaces incorporate surface acoustic wave technology that use attenuation in ultrasound elastic waves on the surface to detect the position of a pen tip contacting the surface. Further examples of sensor surfaces incorporate optical technologies such as projection and reflection of infrared light where triangulation can be used to determine the position of a pen tip relative to the surface. Yet other sensor surfaces incorporate electromagnetic induction technologies that use sensors to detect changes in a magnetic field caused by interaction of a pen with the sensor surface. The present disclosure contemplates that any of the foregoing technologies, combinations of the foregoing technologies, or yet further developed technologies that enable touch sensitivity of a surface, may be used in embodiments of the disclosure.

In some embodiments, sensor surfaces are implemented as digitizer pads that are positioned separately from a display screen. In other embodiments, sensor surfaces are positioned above, below, or integrated with a display screen such that interaction of a pen with the sensor surface causes changes on the display screen at the detected position of the pen tip.

Figure 1:
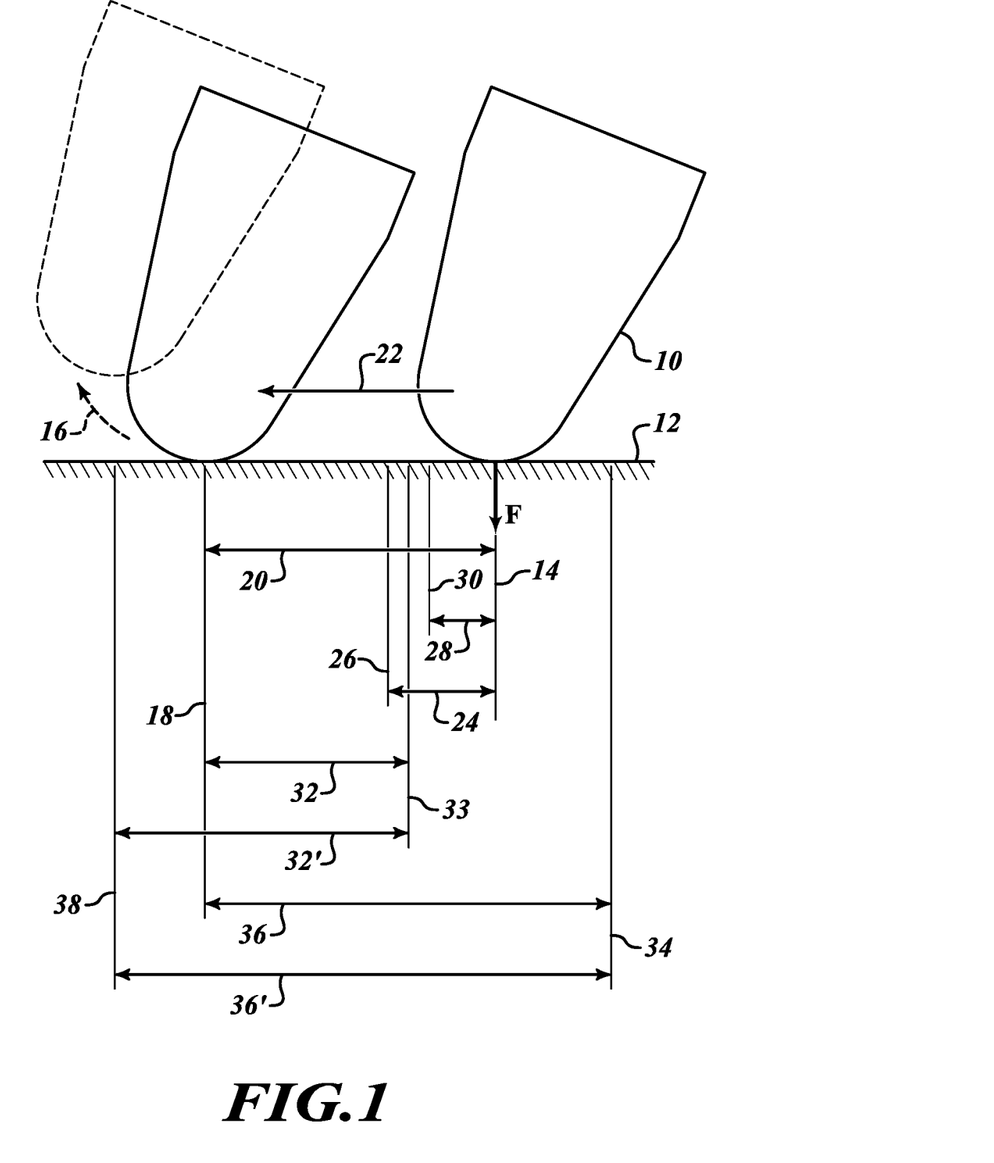
FIG. 1 is a pictorial diagram illustrating an example of unintended movement of a pen tip at a pen up event.

Various embodiments described herein refer to inadvertent or unintended movement of a pen tip on a sensor surface at a pen up event. A pen up event occurs when a detected pressure of the pen tip on the sensor surface, that was previously greater than zero, becomes zero. FIG. 1 is a pictorial diagram illustrating one example of a tip of a pen 10 interacting with a sensor surface 12, wherein unintended movement of the pen tip occurs at a pen up event. In FIG.

1, the user has positioned the tip of the pen 10 on the sensor surface 12 with a downward pressure F at a precise position 14. When the user intends to precisely position the pen tip 10, the user ends the stroke and lifts the tip of the pen 10 from the sensor surface 12, as indicated by arrow 16. However, in the example shown, before the pen tip 10 is lifted from the sensor surface 12, the user has unintentionally caused the tip of the pen 10 to slip from the intended precise position 14 to an unintended end-of-stroke position 18. The distance of the unintentional slip is indicated by reference numeral 20. While in FIG. 1 the slip of the pen tip 10 is shown occurring in the direction of arrow 22, the pen tip 10 may slip in any direction along the surface 12, including a direction opposite to or at an angle to the arrow 22.

When the tip of the pen 10 is on or near the sensor surface 12, the sensor surface 12 detects the position of the pen tip 10 relative to the sensor surface. The sensor surface 12 determines position data, which may be coordinate values, based on the detected position of the pen tip. Coordinate values for example may be expressed as a pair of X, Y numbers that define the position of the pen tip relative to a coordinate system of the sensor surface. The sensor surface 12 reports pen data, including the determined position data to, e.g., an operating system or application software for further processing.

The sensor surface 12 is configured to periodically sample, or detect, the position of the pen tip 10, determine position data representing the detected position of the pen tip 10, and report the position data for further processing. As the pen moves about the sensor surface 12, the position data determined at each sampling is usable to determine a course of movement of the tip of the pen 10 on the sensor surface. When the pen tip 10 is on the sensor surface 12, pressure data detected at each sampling may also be reported. Such pressure data reflects the amount of pressure (e.g., pressure F at position 14), applied by the pen tip 10 on the sensor surface 12.

When a user of the pen intends to place the tip of the pen 10 at a precise position on the sensor surface 12, e.g., in order to position a cursor, object, crosshair, or the like at the precise position, the user tends to slow movement of the pen tip 10 and further hold the pen tip 10 at a relatively steady pressure on the sensor surface when arriving at the precise position. The user then quickly releases the pen tip pressure and lifts the tip of the pen 10 from the sensor surface, which is reflected in a relatively rapid decrease of the detected pen tip pressure in which the pressure drops to zero.

In instances where the user intends to place the tip of the pen 10 at a precise position on the sensor surface 12, embodiments of the present disclosure are configured to detect unintended movement (or "slip") of the pen tip 10 at the time the user lifts the pen from the sensor surface 12. Prior to reporting the position data of the pen tip, e.g., to an operating system, application software, or the like, at the time of the pen up event, circuitry in the sensor surface may modify or alter the position data in accordance with principles of the present disclosure to report the precise position that is believed (or predicted) to have been intended by the user rather than the actual detected position. When the tip of the pen 10 has unintentionally slipped, the predicted intended position is different than the actual detected position of the pen tip 10. As will be seen herein, this modification or alteration of position data is useful to compensate for such unintentional slip of the pen tip 10 at the pen up event. The intended end-of-stroke position data that are predicted according to the present disclosure are reported for further processing, in place of the actual position data that resulted from the unintended slip.

Figure 2:
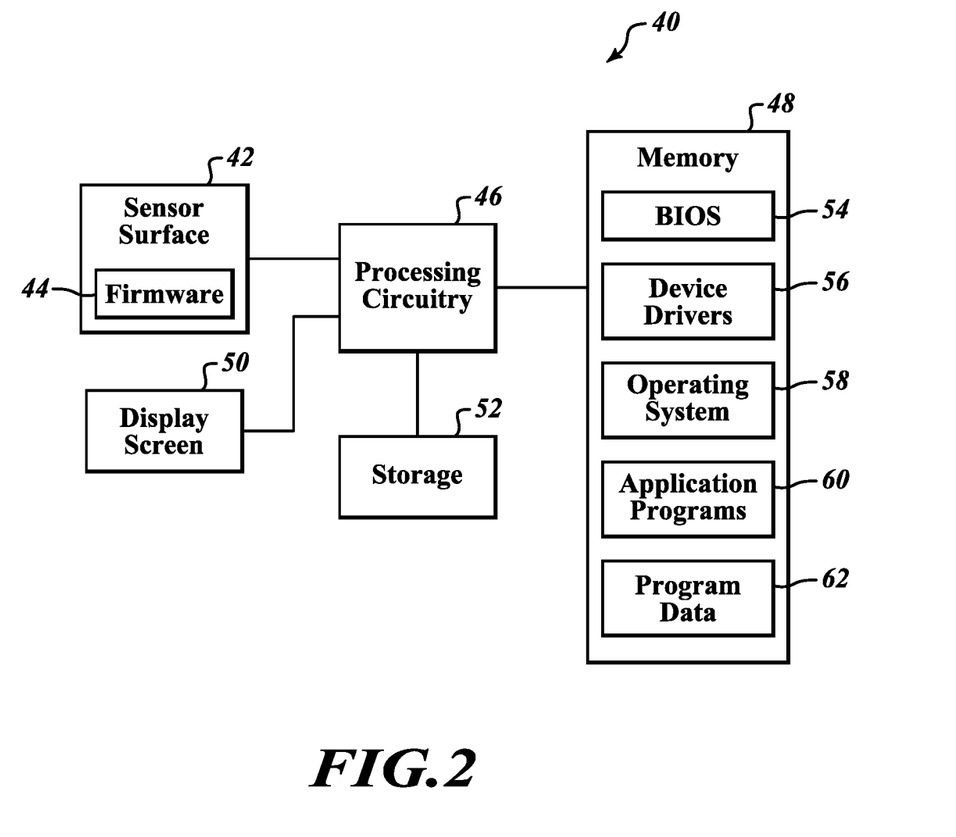
FIG. 2 is a block diagram illustrating one example of a hardware and software configuration of a system operating a sensor surface with firmware in the circuitry of the sensor surface.

FIG. 2 is a block diagram illustrating an example of a system 40 with a sensor surface 42. In at least one embodiment, the sensor surface 42 uses firmware 44 operating in circuitry of the sensor surface 42 or in connection with the sensor surface 42 when determining and reporting position data for a pen that is interacting with the sensor surface 42. In some cases, the system 40 may use a device driver 56 stored in memory 48, in which the device driver 56 is configured to determine and report pen tip position data in accordance with the present disclosure. The system 40 further includes processing circuitry 46 in communication with the sensor surface 42, the memory 48, a display screen 50, and a storage 52. Persons skilled in the art will recognize that suitable systems for operating a sensor surface may include more or fewer components than those illustrated in FIG. 2.

In various embodiments, the display screen 50 includes any type of display screen technology, such as, for example, an LCD, LED, or OLED display. As mentioned earlier, the sensor surface 42 may be implemented as a digitizer pad that is positioned separately from the display screen 50. In other situations, the sensor surface 42 may be positioned above, below, or integrated with the display screen 50 such that interaction of a pen with the sensor surface 42 causes corresponding actions to take place on the display screen 50 at the position of the pen tip on the sensor surface.

In various embodiments, the memory 48 may include circuitry providing a volatile and/or nonvolatile storage, such as RAM, ROM, EPROM, etc. The memory 48 is used, at least in part, for storage and access of software and data for operation of the processing circuitry 46, including a basic input/output system (BIOS) 54, device drivers 56, operating system 58, application programs 60, and program data 62. To the extent longer-term storage of data and programs is needed, the storage 52 may include hard disk drives, optical disk drives, static or flash memory, etc.

As noted above, aspects of operating the sensor surface 42 may be incorporated into firmware 44 operating in circuitry of the sensor surface. Firmware 44 operating in the circuitry of the sensor surface 12 includes firmware operating in connection with the circuitry of the sensor surface 12. Firmware 44 is typically a type of software that, as implemented, provides control, monitoring, operation, and data manipulation capabilities for a device or system, generally at a low level within the device or system. In various embodiments, the firmware 44 may be held in a memory, such as a non-volatile ROM, EPROM, or flash memory, in the sensor surface 42. The memory may be configured to enable future downloading and storage of updated firmware for improved operation of the sensor surface 42. In accordance with principles of the present disclosure, the firmware 44 is configured to modify position data determined by the sensor surface 42 and report the modified position data to, e.g., the operating system 58 or an application program 60 operated by the processing circuitry 46, either directly or via the operating system 58 that controls the overall operation of the processing circuitry 46.

Figure 3:
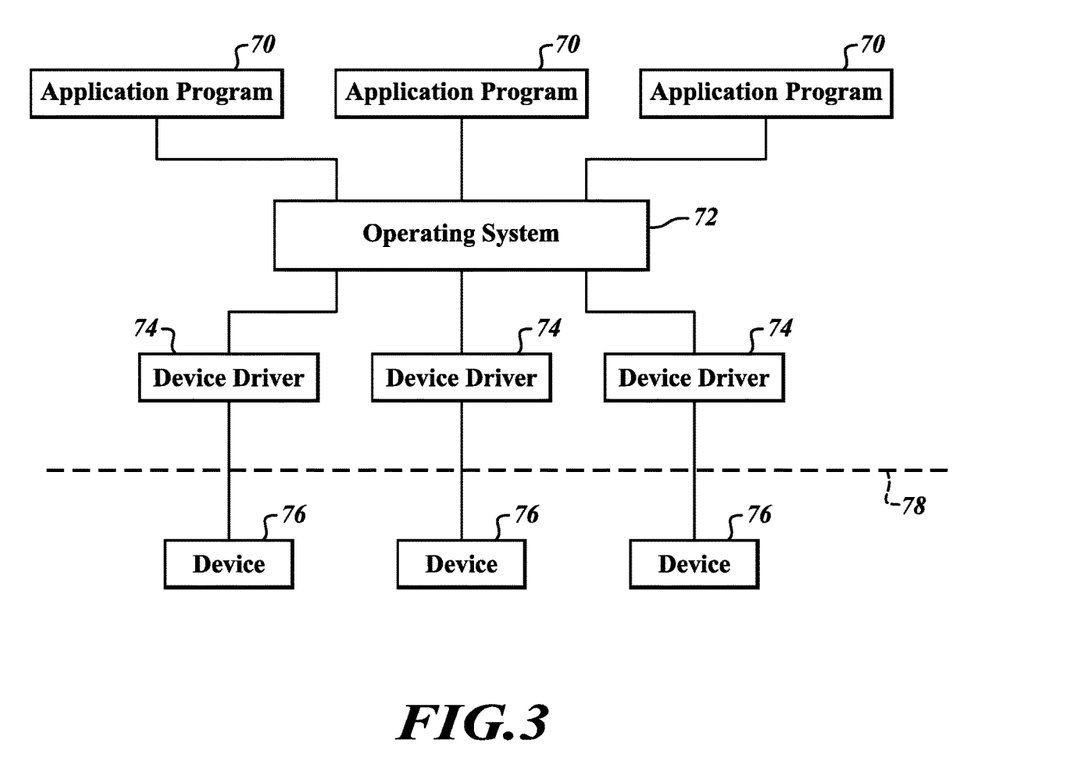
FIG. 3 is a block diagram illustrating a software architecture in which application programs communicate with devices such as a sensor surface via an operating system and device drivers.

Alternatively, in various embodiments, aspects of operating the sensor surface 42 may be incorporated into a device driver 56 that is used for communicating commands and data between the sensor surface 42 and an application program 60, typically via the operating system 58. As generally illustrated in FIG. 3, application programs 70 communicate with devices 76 via an operating system 72 and device drivers 74. A device driver 74 is a software component that enables an operating system 72 or application program 70 to communicate with a device 76. For example, if an application program 70 desires to receive data from a device 76, the application program 70 typically calls a function implemented by the operating system 72, and the operating system 72 calls a function implemented by the device driver 74 associated with the device 76. The device driver 74 is programmed to communicate with the hardware of the device 76 and receive the desired data from the device 76. After the device driver 74 receives the data from the device 76, the device driver 74 communicates the data to the operating system 72, which in turn communicates the data to the application program 70.

In some instances, a bus driver 78 facilitates communication between a device driver 74 and a corresponding device 76. For example, a device 76 may directly connect to a peripheral component interconnect (PCI) bus, wherein the device driver 74 may directly communicate with the device 76 by reading and writing data at logical addresses that are mapped by the PCI bus driver 78 to the respective device 76. In other cases, a device 76 may not directly connect to a PCI bus, but instead connect to a host bus adapter that is connected to the PCI bus. For example, a USB device may connect to a host bus adapter or USB host controller. The device driver 74 communicates indirectly with the device 76 by communicating with the USB host controller which in turn communicates with hardware that communicates with the device 76. In yet other embodiments, a device driver 74 may communicate with a device 76 using I2C or SPI protocols.

Returning to FIG. 2, a device driver 56 for the sensor surface 42 may be configured in accordance with principles of the present disclosure to modify position data detected by the sensor surface 42 and report pen data including the modified position data to the operating system 58 or an application program 60 via the operating system 58, for further processing. In either case, whether the pen data reporting process described above is implemented by firmware 44 or a device driver 56, the result is that the application program 60 can simply receive and act on the reported position data as representing the position of the pen tip, regardless of whether the reported position data represent the actual position of the pen tip. Should an accidental slip of the pen tip occur, for example at a pen up event, the application program 60 does not need any special routines that attempt to detect and/or compensate for the accidental slip. Instead, the accidental slip of the pen tip is already detected and compensated by the firmware 44 or device driver 56, which modify the position data before the position data are reported to the application program 60. Accordingly, the user of the sensor surface 42 may enjoy a uniform experience with the sensor surface 42, regardless of whether the application programs 60 interacting with the sensor surface 42 are able to compensate for an accidental slip of the pen tip.

Figure 4:
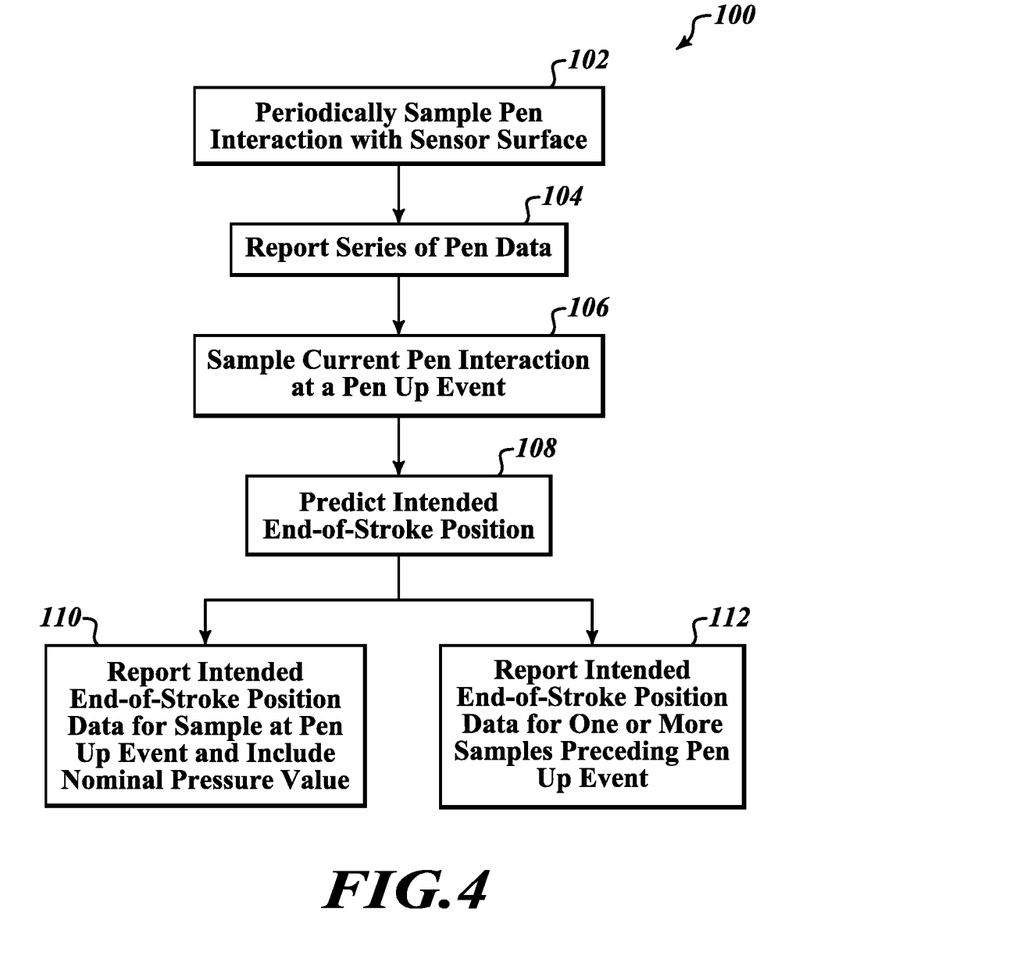
FIG. 4 is a flow diagram illustrating a method for reporting pen data determined from interaction of a pen with a sensor surface according to embodiments of the present disclosure.

FIG. 4 illustrates a method 100 for reporting pen data that are determined from interaction of a pen with a sensor surface according to embodiments of the present disclosure. The method 100 begins at block 102 where circuitry in or operating in connection with the sensor surface periodically samples an interaction of a pen with the sensor surface in which a detected pressure of the pen tip on the sensor surface is greater than zero, i.e., the user of the pen is applying the pen tip to the sensor surface. In at least one embodiment, for example, the sensor surface may periodically sample the interaction of the pen with the sensor surface at 5 ms time intervals. Other embodiments may periodically sample the interaction of the pen with the sensor surface at shorter or longer time intervals.

At block 104, while the circuitry is sampling the pen interaction with the sensor surface, the circuitry reports a series of pen data, $PD_0$ to $PD_{N-1}$, e.g., to an application program or operating system, as earlier described. Each of the pen data, $PD_0$ to $PD_{N-1}$, includes respective pen tip position data, $P_0$ to $P_{N-1}$, that are determined based on the position of the pen tip on the sensor surface as detected in each sampling. Typically, the pen data, $PD_0$ to $PD_{N-1}$, is reported continuously as the data is generated, though possibly with some delay, e.g., pen data from one or a few samples may filtered, smoothed, or otherwise buffered (e.g., to reduce or eliminate jitter) before the pen data is reported. In addition to reporting the pen data, e.g., to an application program or operating system, the circuitry may also include a rolling buffer that temporarily stores recently generated pen data for analysis, including analysis of pen data according to the present disclosure to detect conditions indicating unintentional slip of the pen tip as earlier described. The rolling buffer may be sized for pen data according to the total number of samples that are desired to be retained for analysis, e.g., the last 100 samples. In this manner, at the time of a pen up event, the circuitry is able to analyze recent pen data for conditions that indicate unintentional movement of the pen tip preceding the pen up event.

At block 106, the circuitry samples a current interaction of the pen with the sensor surface at a pen up event in which the detected pressure of the pen tip on the sensor surface is zero, generating pen data, $PD_N$. In response to the pen up event, as indicated at block 108, the circuitry predicts an intended end-of-stroke position, $P_I$, of the pen tip that is believed to represent the precise position of the pen tip intended by the user at the time of the pen up event. In accordance with aspects of the present disclosure, the circuitry predicts the intended end-of-stroke position, $P_I$, based on a detected position of the pen tip that occurred at least two or more samples earlier than the sample at the pen up event. Alternatively, in accordance with aspects of the present disclosure, the circuitry predicts the intended end-of-stroke position, $P_I$, based on a detected position of the pen tip that occurred at least three or more samples earlier than the sample at the pen up event.

In addition or alternative to the above aspects where the intended end-of-stroke position, $P_I$, is based on the detected position of the pen tip that occurred two, three, or more samples earlier than the sample at the pen up event, the circuitry may further base the predicted intended end-of-stroke position, $P_I$, on a detected position of the pen tip occurring more than a predetermined time before the sample at the pen up event. For example, the predetermined time may be at least 10 ms, so the predicted intended end-of-stroke position, $P_I$, may be based on a detected pen tip position occurring 10 ms or more before the sample at the pen up event. In at least some embodiments, the predetermined time is in a range of 10 ms to 100 ms before the sample at the pen up event.

At block 110, the circuitry reports the intended end-of-stroke position, $P_I$, for the detected position of the pen tip. The reporting of the intended end-of-stroke position, $P_I$, may be in the pen data, $PD_N$, for the sample obtained at the pen up event. In such case, the intended end-of-stroke position, $P_I$, is included and reported in the pen data, $PD_N$, in place of the actual position of the pen tip, $P_N$, that was detected in the sample obtained at the time of the pen up event.

Alternatively, or possibly in addition, the reporting of the intended end-of-stroke position, $P_I$, as indicated in block 112, may be in the pen data for one or more samples preceding the pen up event. In such case, the intended end-of-stroke position, $P_I$, is included and reported in the pen data for the one or more samples in place of the actual position of the pen tip detected in the one or more samples preceding the pen up event. In at least one particular case, the circuitry in the sensor surface reports the intended end-of-stroke position, $P_I$, in the pen data, $PD_{N-1}$, for the sample immediately preceding the pen up event, in place of the actual position of the pen tip, $P_{N-1}$, detected in the sample immediately preceding the pen up event.

In addition to detecting the position of the pen tip, circuitry in the sensor surface detects the pressure at which the pen tip is applied to the sensor surface and generates corresponding pressure data. Such pressure data is useful to determine when a pen up event has occurred. As described herein, a pen up event occurs when the detected pressure of the pen tip on the sensor surface, previously greater than zero, has decreased to zero.

In some embodiments, for each pen data in the series of pen data, $PD_0$ to $PD_{N-1}$, the circuitry in the sensor surface may further include corresponding pressure data, $F_0$ to $F_{N-1}$. The pressure data, $F_0$ to $F_{N-1}$, is determined based on the detected pressure of the pen tip on the sensor surface obtained in each sample of the periodic sampling. In embodiments of the present disclosure where the predicted intended end-of-stroke position, $P_I$, is reported in the pen data, $PD_N$, for the sample at the pen up event, the circuitry may include a nominal value for the pressure data, $F_N$, included in the pen data, $PD_N$, in place of the zero pressure value detected at the pen up event, as further indicated at block 110 in FIG. 4. In such a case, the application program that receives the pen data, $PD_N$, will process the pen data as if the pen tip was still applied, though very slightly, on the sensor surface. In embodiments where a sensor surface detects touch as a binary event (only one bit, i.e., a "1" is needed to indicate the presence of pressure, or "0" to indicate no detected pressure), the nominal pressure value for the pressure data, $F_N$, included in the pen data, $PD_N$, would be "1."

In some embodiments, the circuitry in the system is further configured to determine unintended positioning of the pen tip in one or more samples of the pen interaction preceding the pen up event. Unintended positioning of the pen tip in this respect is determined based on the detected pressure of the pen tip in the one or more samples. For example, if the pen pressure detected in a first set of samples preceding the pen up event is steady or consistent (i.e., the detected pen tip pressure does not vary or only varies within a predetermined small range), and then in a second set of samples occurring after the first set of samples but still preceding the pen up event the detected pen tip pressure shows a rapid decrease in pressure (the pressure decrease exceeding a predetermined threshold), a pen tip position detected at the end or near the end of the first set of samples may be considered "stable" and constituting the intended end-of-stroke position, $P_I$, for the pen tip. This predicted intended end-of-stroke position, $P_I$, may then be substituted for the actual pen tip position(s) detected in one or more of the samples in the second set of samples. In the above example, the pen tip position(s) detected in the second set of samples may be determined "unstable" and not reflecting the user's intended pen tip positioning at the end of the user's pen stroke. In such cases, the predicted intended end-of-stroke position, $P_I$, may be reported in place of the detected position of the pen tip in the pen data for each of the one or more "unstable" samples in the second set where unintended positioning of the pen tip has been determined. The intended end-of-stroke position, $P_I$, in such cases is predicted using a detected position of the pen tip that occurs in a "stable" sample in the first set in which unintended positioning of the pen tip has not been determined.

In some cases, the "stable" samples in the first set of samples may be distinguished from the "unstable" samples in the second set of samples by calculating a change or slope of detected pressure over a sliding window of samples. When the calculated change or slope shows a pressure that has been steady or consistent, the samples may be determined to be "stable" and the position data in such stable samples are determined to reflect intended positioning of the pen tip. Then, when the calculated change or slope of pressure shows a rapidly decreasing pressure that exceeds a predetermined threshold, the samples occurring in the time period of rapidly decreasing pressure may be determined to be "unstable" and the position data in such unstable samples are determined to reflect unintended positioning of the pen tip.

In some cases, for comparison of a first set of samples in which the calculated change or slope of pressure is steady or consistent with a subsequent set of samples that indicates a rapidly decreasing pressure, two (or more) sliding windows representing different time periods of sampling may be employed. The circuitry in the system may monitor the change or slope of pressure detected in the samples in the two or more sliding windows and based on the monitored change or slop of pressure, determine when "stable" position data becomes "unstable."

As noted, at a pen up event, embodiments of the disclosure are configured to compensate for unintended slip of the pen tip by reporting a predicted intended end-of-stroke position, $P_I$, that is believed to represent the location that the user targeted before they lifted the pen from the sensor surface, in place of the actual detected end-of-stroke position. It is acknowledged however that, with some uses of a pen on a sensor surface, a user may intend a final movement of the pen tip in the samples preceding the pen up event. To help distinguish intended from unintended final movement of the pen tip at a pen up event, embodiments of the disclosure may implement one or more conditions that must be satisfied before a predicted intended end-of-stroke position is reported in place of an actual detected pen tip position, e.g., as described in FIGS. 5 to 8. In this manner, the substitution of predicted intended position data for actual position data, as described herein, occurs when there is higher probability that the user intended to release the pen tip at a precise location when they lifted the pen from the sensor surface.

First Condition

Figure 5:
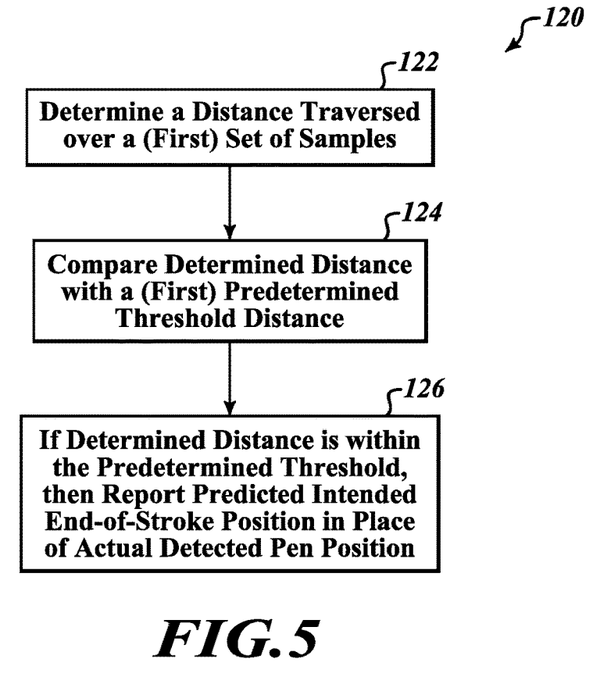
FIG. 5 is a flow diagram illustrating a first condition to be satisfied in accordance with the present disclosure.

FIG. 5 is a flow diagram illustrating a first condition 120 to be satisfied in accordance with the present disclosure. In this regard, the circuitry in the system may evaluate movement of the pen tip over a set of samples preceding a pen up event but not immediately preceding the pen up event (e.g., the set of samples occurring at least 40-50 ms before the pen up event). When a user has intended to release the pen tip at a precise location, there is typically minimal to no movement of the pen tip during a targeting period leading up to the pen up event. Thus, as indicated at block 122, in response to a pen up event, the circuitry in the system may be configured to determine a distance traversed by the pen tip on the sensor surface over a set of samples preceding the pen up event. The distance traversed by the pen tip is determined based on a difference of the detected position(s) of the pen tip over the set of samples. For example, in at least one embodiment, the circuitry may consider the distance traversed by the pen tip over a set of samples ranging from 18 samples to 10 samples before the pen up event. At block 124, the circuitry may then compare the determined distance with a predetermined threshold distance, and if the determined distance is within the predetermined threshold distance (e.g., the determined distance is less than the predetermined threshold distance), as indicated at block 126, the circuitry reports the predicted intended end-of-stroke position, $P_I$, for the actual detected position of the pen tip. In some cases, the circuitry reports the intended end-of-stroke position, $P_I$, for the detected position of the pen tip only when the determined distance is within the predetermined threshold distance.

With reference to FIG. 1, an exemplary implementation of the first condition 120 described above includes determining a distance 28 that is traversed by the pen tip 10 over a set of samples, here measured from the sample coinciding with the intended end-of-stroke position 14 to a sample 30 preceding the unintended actual end-of-stroke position 18. The determined distance 28 is compared with a predetermined threshold distance 24. In this example, the determined distance 28 is less than threshold distance 24, indicating that over a period of time preceding the actual end-of-stroke position 18, the user's movement of the pen tip was minimal, suggesting that the user had been attempting to bring the pen tip to a precise location on the sensor surface. Accordingly, the first condition is satisfied and the circuitry in the system reports the predicted intended end-of-stroke position 14 in place of the actual end-of-stroke position 18 that was detected in the sample at the pen up event.

Since the sensor surface is two dimensional, the predetermined threshold distance may be defined as a two-dimensional shape surrounding a position on the surface. For example, the threshold distance 24 may be defined as a circular threshold having a predetermined radius extending from a detected position in one of the samples at or preceding the pen up event, such as the sample at the position 14 shown in FIG. 1. In such example, the radius of such a circular threshold may be represented by the distance 24 shown in FIG. 1. In other embodiments, the predetermined threshold distance may be rectangular threshold having a predetermined length and width surrounding a position, such as the position 14, detected in one of the samples at or preceding the pen up event that occurred at position 18. If desired, the size of the threshold distance may be predetermined based on experimental data that includes position recordings in instances where users intended to precisely position the pen tip at the end of the pen stroke and instances where user did not intend to precisely position the pen tip at the end of the pen stroke. Alternately, if desired, the threshold distance may be adjustable by the user in an appropriate control feature in the device driver or application software.

Second Condition

Figure 6:
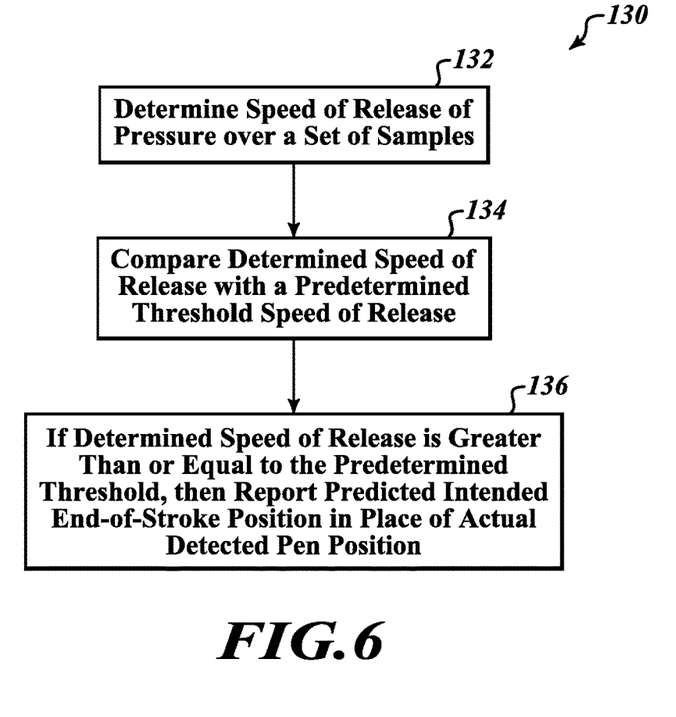
FIG. 6 is a flow diagram illustrating a second condition to be satisfied in accordance with the present disclosure.

FIG. 6 is a flow diagram illustrating a second condition 130 to be satisfied in accordance with the present disclosure. In this regard, the circuitry in the system may evaluate the speed at which the user lifted the pen from the sensor surface at the pen up event. This is accomplished by determining the speed (e.g., slope) of decrease of detected pen tip pressure during a targeting period preceding the pen up event. When a user has intended to release the pen tip at a precise location, the user tends to quickly lift the pen up, indicating a clear intention to lift the pen tip at a particular location. Thus, in response to a pen up event, the circuitry in the system may be configured to determine the speed of release of pressure of the pen tip on the sensor surface over a set of samples preceding the pen up event, as indicated at block 132.

The speed of release is determined based on a difference of detected pressure of the pen tip over the set of samples. At block 134, the circuitry may compare the determined speed of release of pressure with a predetermined threshold speed of release, and if the determined speed of release is greater than or equal to the predetermined threshold speed of release, the circuitry reports the predicted intended end-of-stroke position, $P_I$, for the actual detected position of the pen tip, as indicated at block 136. In some cases, the circuitry reports the intended end-of-stroke position, $P_I$, for the detected position of the pen tip only when the determined speed of release is greater than or equal to the predetermined threshold speed of release. If desired, the size of the threshold speed of release may be predetermined based on experimental data that includes pressure recordings in instances where users intended to precisely position the pen tip at the end of the pen stroke and instances where user did not intend to precisely position the pen tip at the end of the pen stroke. Alternately, if desired, the threshold speed of release of pressure may be adjustable by the user in an appropriate control feature in the device driver or application software.

Third Condition

Figure 7:
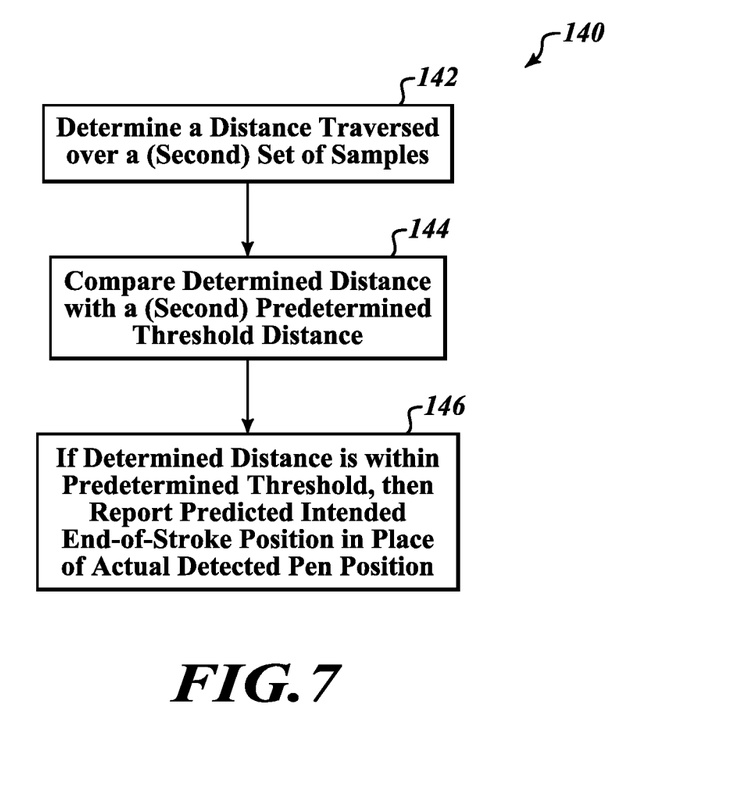
FIG. 7 is a flow diagram illustrating a third condition to be satisfied in accordance with the present disclosure.

FIG. 7 is a flow diagram illustrating a third condition 140 to be satisfied in accordance with the present disclosure. In this regard, the circuitry in the system may evaluate movement of the pen tip over a set of samples preceding a pen up event. This set of samples is different than the set of samples evaluated in the first condition described above, though there may be some overlap (i.e., some samples may be included in both the set of samples considered in evaluating the first condition 120 and the set of samples considered in evaluating the third condition 140). The set of samples used for evaluating this third condition may include samples that are closer in time to the pen up event than the samples used in evaluating the first condition above. When a user has intended to release the pen tip at a precise location, the movement of the pen tip during a targeting period before and possibly up to the pen up event is usually within a certain limit. To the contrary, if a user intends to add a swoosh or similar effect at the end of a pen stroke, the movement of the pen tip before the pen up event usually exceeds such a limit. Thus, as indicated at block 142, in response to a pen up event, the circuitry in the system may be configured to determine a distance traversed by the pen tip on the sensor surface over a set of samples preceding the pen up event.

The distance traversed by the pen tip is determined based on a difference of the detected position(s) of the pen tip over the set of samples. For example, in at least one embodiment, the circuitry may consider the distance traversed by the pen tip over a set of samples that includes the last 10 samples before the pen up event. The circuitry may then compare the determined distance with a predetermined threshold distance as indicated in block 144, and if the determined distance is within the predetermined threshold distance (e.g., the determined distance is less than the predetermined threshold distance), the circuitry reports the predicted intended end-of-stroke position, $P_I$, for the detected position of the pen tip, as indicated in block 146. In some cases, the circuitry reports the intended end-of-stroke position, $P_I$, for the detected position of the pen tip only when the determined distance is within the predetermined threshold distance. If desired, the size of the threshold distance is this regard may be predetermined based on experimental data that includes position recordings in instances where users intended to precisely position the pen tip on the sensor surface at the end of the pen stroke and instances where user did not intend to precisely position the pen tip at the end of the pen stroke. Alternately, if desired, the threshold distance may be adjustable by the user in an appropriate control feature in the device driver or application software.

With reference to FIG. 1, one exemplary implementation of the third condition 140 includes determining a distance 32 that is traversed by the pen tip 10 in a period preceding the pen up event at the unintended position 18. In some embodiments, this period may be defined as beginning a number of samples (such as 10 samples) or beginning at a time (such as 50 ms) before the pen up event. In the illustrated example, the period begins at a sample in which the pen tip is detected at position 33, which occurs after the sample predicted to be the user's intended end-of-stroke at position 14. The distance 32 is determined from the set of samples spanning from the position 33 to the actual end-of-stroke at position 18.

The determined distance 32 may then compared with a predetermined threshold distance 36. In this example, the determined distance 32 is less than the threshold distance 36, indicating that the user's movement of the pen tip 10 right before the pen up event was small enough to suggest that the user had been attempting to position the pen tip at a precise location on the sensor surface. Accordingly, in the illustrated example, the third condition is satisfied and the circuitry in the system reports the predicted intended end-of-stroke position 14 in place of the actual detected position 18 at the pen up event, as indicated at block 136. In some cases, the circuitry reports the predicted intended end-of-stroke position for the detected position of the pen tip only when the determined distance 32 is within (shorter or less than) the predetermined threshold distance 36.

It should be recognized that in various embodiments, different periods and different threshold distances may be used when evaluating a distance traversed by the pen tip 10 prior to the pen up event. For instance, while in the embodiment described above the distance 32 was determined beginning with the sample at position 18 where a non-zero pen tip pressure (typically the last non-zero pressure) was detected and extending to an earlier position 33, a different embodiment of the invention may evaluate a distance traversed by the pen tip 10 over a different period. For example, an embodiment may determine a distance 32' beginning at position 38 where a zero pen tip pressure was detected and extending from there to the earlier position 33. The position 38 may be the position where the system first detected the zero pen tip pressure.

Similarly, while the description above used a predetermined threshold distance 36 beginning with the sample at position 18 where the last non-zero pen tip pressure was detected and extending to a position 34, a different embodiment may use a different threshold distance. For example, an embodiment may use a threshold distance 36' beginning at position 38 where the first zero pen tip pressure was detected and extending from there to a position 34.

By way of comparison, the predetermined threshold distance used when implementing the third condition 140 is typically larger (i.e., longer) than the threshold distance used when implementing the first condition 120. The predetermined threshold distance 36, 36' used in the third condition 140 should be large enough to include any permissible slip of the pen tip.

Combinations of Conditions

In some embodiments, the first condition 120 is implemented alone, without either of the second or third conditions 130, 140 being implemented. In some embodiments, the second condition 130 is implemented alone, without either of the first or third conditions 120, 140 being implemented. In yet other embodiments, the third condition 130 is implemented alone, without either of the first or second conditions 120, 130 being implemented.

In some embodiments, the first and second conditions 120, 130 may be implemented in combination. In other words, an embodiment of the present disclosure may implement a combination of the first and second conditions 120, 130 in which the predicted intended end-of-stroke position is reported in place of the actual detected end-of-stroke position when both the determined distance of the first condition 120 is within the predetermined threshold distance and the determined speed of release of the second condition 130 is greater than or equal to the predetermined threshold speed of release.

Another embodiment of the present disclosure may implement a combination of the first and third conditions 120, 140. In such embodiment, the set of samples evaluated in the first condition 120 may be a first set of samples, the determined distance of the first condition 120 is a first distance, and the predetermined threshold distance of the first condition 120 is a first threshold distance. In response to a pen up event, the circuitry is configured to determine the first distance traversed by the pen tip on the sensor surface over the first set of samples preceding the pen up event according to the first condition 120, and determine a second distance traversed by the pen tip on the sensor surface over a second set of samples preceding the pen up event according to the third condition 140, wherein the second distance is determined based on a difference of detected positions of the pen tip over the second set of samples. Typically, the second set of samples includes samples that are more recent than the samples in the first set of samples.

The determined first distance is compared with a predetermined first threshold distance, and the determined second distance is compared with a predetermined second threshold distance. The circuitry reports the intended end-of-stroke position, $P_I$, for the detected position of the pen tip when both the first distance is within the first threshold distance according to the first condition 120 and the second distance is within the predetermined second threshold distance of the third condition 140. In some cases, the circuitry may report the intended end-of-stroke position, $P_I$, for the detected position of the pen tip only when both the first distance is within the first threshold distance and the second distance is within the predetermined second threshold distance.

Yet another embodiment of the present disclosure may implement a combination of the second and third conditions 130, 140. In response to a pen up event, the circuitry is configured to determine a speed of release of pressure of the pen tip on the sensor surface over a set of samples preceding the pen up event, e.g., based on a difference of detected pressure of the pen tip over the set of samples, according to the second condition 130. The circuitry also determines a distance traversed by the pen tip on the sensor surface over a set of samples preceding the pen up event, wherein the distance is determined based on a difference of detected positions of the pen tip over the second set of samples, according to the third condition 140.

The circuitry may compare the determined speed of release of pressure with a predetermined threshold speed of release, and also compare the determined distance with a predetermined threshold distance. If the determined speed of release of the second condition 130 is greater than or equal to the predetermined threshold speed of release and the determined distance of the third condition 140 is within the predetermined threshold distance, the circuitry reports the predicted intended end-of-stroke position, $P_I$, for the detected position of the pen tip. In some cases, the circuitry reports the intended end-of-stroke position, $P_I$, for the detected position of the pen tip only when both the determined speed of release is greater than or equal to the predetermined threshold speed of release and the determined distance is within the predetermined threshold distance.

In still another embodiment of the present disclosure, a combination of the first, second, and third conditions 120, 130, 140 may be implemented. For example, in at least one such embodiment, the set of samples evaluated in the first condition 120 may be a first set of samples, the determined distance of the first condition 120 is a first distance, and the predetermined threshold distance of the first condition 120 is a first threshold distance.

In response to a pen up event, the circuitry in the system may be configured to: determine the first distance traversed by the pen tip on the sensor surface over the first set of samples preceding the pen up event according to the first condition 120; determine a speed of release of pressure of the pen tip on the sensor surface over a set of samples preceding the pen up event according to the second condition 130; and determine a second distance traversed by the pen tip on the sensor surface over a second set of samples preceding the pen up event according to the third condition 140.

In this embodiment, the first distance is compared with the predetermined first threshold distance, the determined speed of release is compared with the predetermined threshold speed of release, and the second distance is compared with the predetermined second threshold distance. The circuitry is configured to report the intended end-of-stroke position, $P_I$, for the detected position of the pen tip when the first distance of the first condition 120 is within the first threshold distance, the speed of release of the second condition 130 is greater than or equal to the predetermined threshold speed of release, and the second distance of the third condition 140 is within the predetermined second threshold distance. In some cases, the intended end-of-stroke position, $P_I$, is reported for the detected position of the pen tip only when the first distance is within the first threshold distance, the second distance is within the predetermined second threshold distance, and the speed of release is greater than or equal to the predetermined threshold speed of release.

When implementing a combination of the conditions 120, 130, 140, the steps of determining a distance or speed value and comparing the value to a threshold according to the respective condition may be predicated on another condition already having been satisfied. For example, the circuitry may be configured to determine the speed of release according to the second condition 130 only after determining that the second distance of the third condition 140 is within the predetermined second threshold distance. As another example, the circuitry may be configured to determine the second distance of the third condition 140 only after determining that the speed of release of the second condition 130 is greater than or equal to the predetermined threshold speed of release. Yet further examples may require satisfaction of the first condition 120 before evaluating the second condition 130 and/or the third condition 140.

In various embodiments, the present disclosure also encompasses non-transitory computer-readable media having executable code stored thereon. In response to execution of the code, the code configures or otherwise causes processing circuitry to implement the method steps and functions as described herein.

For example, in response to execution, code stored on a computer-readable medium may cause processing circuitry to periodically sample an interaction of a pen with a sensor surface in which a detected pressure of the pen tip on the sensor surface is greater than zero, and report a series of pen data, $PD_0$ to $PD_{N-1}$, wherein each pen data, $PD_0$ to $PD_{N-1}$, includes respective position data, $P_0$ to $P_{N-1}$, based on a detected position of the pen tip on the sensor surface in each sampling.

Execution of the code in this example may further cause the processing circuitry to sample a current interaction of the pen with the sensor surface at a pen up event in which the detected pressure of the pen tip on the sensor surface is zero, and in response to the pen up event, predict an intended end-of-stroke position, $P_I$, of the pen tip based on a detected position of the pen tip occurring at least two, three, or more samples earlier than the sample at the pen up event, and reporting the intended end-of-stroke position, $P_I$, for the detected position of the pen tip in (1) pen data, $PD_N$, for the sample at the pen up event, wherein the intended end-of-stroke position, $P_I$, is reported in the pen data, $PD_N$, in place of the position of the pen tip, $P_N$, detected in the sample at the pen up event, or in (2) pen data for one or more samples preceding the pen up event, wherein the intended end-of-stroke position, $P_I$, is reported in the pen data for the one or more samples in place of the position of the pen tip detected in the one or more samples preceding the pen up event.

The various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of generating pen data, comprising:
    periodically sampling an interaction of a pen with a sensor surface in which a detected pressure of a tip of the pen on the sensor surface is greater than zero, and reporting a series of pen data, $PD_0$ to $PD_{N-1}$, wherein each pen data, $PD_0$ to $PD_{N-1}$, includes respective position data, $P_0$ to $P_{N-1}$, based on a detected position of the pen tip on the sensor surface in each sampling;
    sampling a current interaction of the pen with the sensor surface at a pen up event in which the detected pressure of the pen tip on the sensor surface is zero; and
    in response to the pen up event:
        predicting an intended end-of-stroke position, $P_I$, of the pen tip based on a detected position of the pen tip occurring at least three or more samples earlier than the sample at the pen up event; and
        reporting the intended end-of-stroke position, $P_I$, for the detected position of the pen tip:
            in pen data, $PD_N$, for the sample at the pen up event, wherein the intended end-of-stroke position, $P_I$, is reported in the pen data, $PD_N$, in place of the position of the pen tip, $P_N$, detected in the sample at the pen up event, and a nominal value for pressure data, $F_N$, in the pen data, $PD_N$, is added or substituted for the zero pressure detected in the sample at the pen up event; or in pen data for one or more samples preceding the pen up event, wherein the intended end-of-stroke position, $P_I$, is reported in the pen data for the one or more samples in place of the position of the pen tip detected in the one or more samples preceding the pen up event.

2. The method of claim 1, wherein the predicted intended end-of-stroke position, $P_I$, is further based on a detected position of the pen tip in a sample occurring more than a predetermined time before the pen up event.

3. The method of claim 2, wherein the predetermined time is at least 10 ms before the sample at the pen up event.

4. The method of claim 1, wherein the intended end-of-stroke position, $P_I$, is reported in the pen data, $PD_{N-1}$, for the sample immediately preceding the pen up event in place of the position of the pen tip, $P_{N-1}$, detected in the sample immediately preceding the pen up event.

5. The method of claim 1, wherein each pen data in the series of pen data, $PD_0$ to $PD_{N-1}$, further includes pressure data, $F_0$ to $F_{N-1}$, based on the detected pressure of the pen tip on the sensor surface in each sampling.

6. The method of claim 1, further comprising:
in response to the pen up event, determining a distance traversed by the pen tip on the sensor surface over a set of samples preceding the pen up event but not immediately preceding the pen up event, wherein the distance is determined based on a difference of detected position of the pen tip over the set of samples; and
comparing the determined distance with a predetermined threshold distance,
wherein said reporting the intended end-of-stroke position, $P_I$, for the detected position of the pen tip is performed only when the determined distance is within the predetermined threshold distance.

7. The method of claim 6, wherein the predetermined threshold distance is a circular threshold having a predetermined radius from a detected position in the set of samples, or wherein the predetermined threshold distance is rectangular threshold having a predetermined length and width surrounding a detected position in the set of samples.

8. The method of claim 6, wherein the set of samples is a first set of samples, the determined distance is a first distance, and the predetermined threshold distance is a first threshold distance, the method further comprising:
in response to the pen up event, determining a second distance traversed by the pen tip on the sensor surface over a second set of samples preceding the pen up event, wherein the second set of samples includes samples that are closer in time to the pen up event than the samples in the first set of samples, and wherein the second distance is determined based on a difference of detected position of the pen tip over the second set of samples; and
compare the determined second distance with a predetermined second threshold distance,
wherein said reporting the intended end-of-stroke position, $P_I$, for the detected position of the pen tip is performed only when the first distance is within the first threshold distance and the second distance is within the second threshold distance.

9. The method of claim 1, further comprising:
in response to the pen up event, determining a speed of release of pressure of the pen tip on the sensor surface over a set of samples preceding the pen up event, wherein the speed of release is determined based on a difference of detected pressure of the pen tip over the set of samples; and
comparing the determined speed of release with a predetermined threshold speed of release,
wherein said reporting the intended end-of-stroke position, $P_I$, for the detected position of the pen tip is performed only when the determined speed of release is greater than or equal to the predetermined threshold speed of release.

10. The method of claim 9, further comprising:
determining unintended positioning of the pen tip in one or more samples preceding the pen up event, wherein unintended positioning of the pen tip is determined based on the detected pressure of the pen tip in the one or more samples; and
reporting the intended end-of-stroke position, $P_I$, for the detected position of the pen tip in the pen data for each of the one or more samples in which unintended positioning of the pen tip has been determined,
wherein the intended end-of-stroke position, $P_I$, is predicted using a detected position of the pen tip occurring in a sample in which unintended positioning of the pen tip has not been determined.

11. The method of claim 9, wherein when the determined speed of release is greater than or equal to the predetermined threshold speed of release, the method further comprises, before said reporting the intended end-of-stroke position, $P_I$, for the detected position of the pen tip is performed:
in response to the pen up event, determining a distance traversed by the pen tip on the sensor surface over a set of samples preceding the pen up event but not immediately preceding the pen up event, wherein the distance is determined based on a difference of detected position of the pen tip over the set of samples; and
comparing the determined distance with a predetermined threshold distance,
wherein said reporting the intended end-of-stroke position, $P_I$, for the detected position of the pen tip is performed only when the determined speed of release is greater than or equal to the predetermined threshold speed of release and the determined distance is within the predetermined threshold distance.

12. A system for generating pen data, comprising:
a sensor surface providing an interface for interaction with a pen; and
circuitry configured to periodically sample an interaction of the pen with the sensor surface in which a detected pressure of a tip of the pen on the sensor surface is greater than zero, wherein the circuitry reports a series of pen data, $PD_0$ to $PD_{N-1}$, each pen data, $PD_0$ to $PD_{N-1}$, including respective position data, $P_0$ to $P_{N-1}$, based on a detected position of the pen tip on the sensor surface in each sample;
wherein, in operation, the circuitry is further configured to:
sample a current interaction of the pen with the sensor surface at a pen up event in which the detected pressure of the pen tip on the sensor surface is zero; and
in response to the pen up event:
predict an intended end-of-stroke position, $P_I$, of the pen tip based on a detected position of the pen tip occurring at least three or more samples earlier than the sample at the pen up event; and
report the intended end-of-stroke position, $P_I$, for the detected position of the pen tip in pen data for one or more samples preceding the pen up event, wherein the intended end-of-stroke position, $P_I$, is reported in the pen data for the one or more samples in place of the position of the pen tip detected in the one or more samples preceding the pen up event.

13. The system of claim 12, wherein the circuitry is configured to report the intended end-of-stroke position, $P_I$, in the pen data, $PD_{N-1}$, for the sample immediately preceding the pen up event in place of the position of the pen tip, $P_{N-1}$, detected in the sample immediately preceding the pen up event.

14. The system of claim 12, wherein for each pen data in the series of pen data, $PD_0$ to $PD_{N-1}$, the circuitry is further configured to include pressure data, $F_0$ to $F_{N-1}$, based on the detected pressure of the pen tip on the sensor surface in each sampling.

15. The system of claim 12, wherein the circuitry is further configured to:
  in response to the pen up event, determine a distance traversed by the pen tip on the sensor surface over a set of samples preceding the pen up event but not immediately preceding the pen up event, wherein the distance is determined based on a difference of detected position of the pen tip over the set of samples; and
  compare the determined distance with a predetermined threshold distance,
  wherein the circuitry reports the intended end-of-stroke position, $P_I$, for the detected position of the pen tip only when the determined distance is within the predetermined threshold distance.

16. The system of claim 15, wherein the predetermined threshold distance is a circular threshold having a predetermined radius from a detected position in the set of samples, or wherein the predetermined threshold distance is rectangular threshold having a predetermined length and width surrounding a detected position in the set of samples.

17. The system of claim 15, wherein the set of samples is a first set of samples, the determined distance is a first distance, and the predetermined threshold distance is a first threshold distance, and wherein the circuitry is further configured to:
  in response to the pen up event, determine a second distance traversed by the pen tip on the sensor surface over a second set of samples preceding the pen up event, wherein the second set of samples includes samples that are closer in time to the pen up event than the samples in the first set of samples, and wherein the second distance is determined based on a difference of detected position of the pen tip over the second set of samples; and
  compare the determined second distance with a predetermined second threshold distance,
  wherein the circuitry reports the intended end-of-stroke position, $P_I$, for the detected position of the pen tip only when the first distance is within the first threshold distance and the second distance is within the second threshold distance.

18. The system of claim 17, wherein the circuitry is further configured to:
  in response to the pen up event, determine a speed of release of pressure of the pen tip on the sensor surface over a set of samples preceding the pen up event, wherein the speed of release is determined based on a difference of detected pressure of the pen tip over the set of samples; and
  compare the determined speed of release with a predetermined threshold speed of release,
  wherein the circuitry reports the intended end-of-stroke position, $P_I$, for the detected position of the pen tip only when the first distance is within the first threshold distance, the second distance is within the second threshold distance, and the determined speed of release is greater than or equal to the threshold speed of release.

19. The system of claim 12, wherein the circuitry is further configured to:
  in response to the pen up event, determine a speed of release of pressure of the pen tip on the sensor surface over a set of samples preceding the pen up event, wherein the speed of release is determined based on a difference of detected pressure of the pen tip over the set of samples; and
  compare the determined speed of release with a predetermined threshold speed of release,
  wherein the circuitry reports the intended end-of-stroke position, $P_I$, for the detected position of the pen tip only when the determined speed of release is greater than or equal to the predetermined threshold speed of release.

20. The system of claim 19, wherein the circuitry is further configured to:
  determine unintended positioning of the pen tip in one or more samples preceding the pen up event, wherein unintended positioning of the pen tip is determined based on the detected pressure of the pen tip in the one or more samples; and
  report the intended end-of-stroke position, $P_I$, for the detected position of the pen tip in the pen data for each of the one or more samples in which unintended positioning of the pen tip has been determined,
  wherein the intended end-of-stroke position, $P_I$, is predicted using a detected position of the pen tip occurring in a sample in which unintended positioning of the pen tip has not been determined.

21. The system of claim 19, wherein when the determined speed of release is greater than or equal to the predetermined threshold speed of release, and before the circuitry reports the intended end-of-stroke position, $P_I$, for the detected position of the pen tip, the circuitry is further configured to:
  in response to the pen up event, determine a distance traversed by the pen tip on the sensor surface over a set of samples preceding the pen up event but not immediately preceding the pen up event, wherein the distance is determined based on a difference of detected position of the pen tip over the set of samples; and
  compare the determined distance with a predetermined threshold distance,
  wherein the circuitry reports the intended end-of-stroke position, $P_I$, for the detected position of the pen tip only when the determined speed of release is greater than or equal to the predetermined threshold speed of release and the determined distance is within the predetermined threshold distance.

22. A system for generating pen data, comprising:
  a sensor surface providing an interface for interaction with a pen; and
  circuitry configured to periodically sample an interaction of the pen with the sensor surface in which a detected pressure of a tip of the pen on the sensor surface is greater than zero, wherein the circuitry reports a series of pen data, $PD_0$ to $PD_{N-1}$, each pen data, $PD_0$ to $PD_{N-1}$, including respective position data, $P_0$ to $P_{N-1}$, based on a detected position of the pen tip on the sensor surface in each sample;
  wherein, in operation, the circuitry is further configured to:

sample a current interaction of the pen with the sensor surface at a pen up event in which the detected pressure of the pen tip on the sensor surface is zero; and in response to the pen up event:

predict an intended end-of-stroke position, $P_I$, of the pen tip based on a detected position of the pen tip occurring at least three or more samples earlier than the sample at the pen up event; and report the intended end-of-stroke position, $P_I$, for the detected position of the pen tip in pen data, $PD_N$, for the sample at the pen up event, wherein the intended end-of-stroke position, $P_I$, is reported in the pen data, $PD_N$, in place of the position of the pen tip, $P_N$, detected in the sample at the pen up event, and a nominal value for pressure data, $F_N$, in the pen data, $PD_N$, is added or substituted for the zero pressure detected in the sample at the pen up event.

23. The system of claim 22, wherein the circuitry is further configured to:

in response to the pen up event, determine a distance traversed by the pen tip on the sensor surface over a set of samples preceding the pen up event but not immediately preceding the pen up event, wherein the distance is determined based on a difference of detected position of the pen tip over the set of samples; and compare the determined distance with a predetermined threshold distance, wherein the circuitry reports the intended end-of-stroke position, $P_I$, for the detected position of the pen tip only when the determined distance is within the predetermined threshold distance.

* * * * *